United States Patent [19]

Hatch

[11] 4,365,936

[45] Dec. 28, 1982

[54] LAMINATED ELASTOMERIC BEARING UNIT

[75] Inventor: Seymour A. Hatch, Bensenville, Ill.

[73] Assignee: Chicago Rawhide Manufacturing Company, Elgin, Ill.

[21] Appl. No.: 100,841

[22] Filed: Dec. 6, 1979

[51] Int. Cl.³ ............................................. B64C 27/38
[52] U.S. Cl. ................................. 416/134 A; 416/141
[58] Field of Search ......................... 416/134 A, 141

[56] References Cited

U.S. PATENT DOCUMENTS

| | | | |
|---|---|---|---|
| 3,759,632 | 9/1973 | Rybicki | 416/134 A |
| 3,764,230 | 10/1973 | Rybicki et al. | 416/134 A |
| 3,829,239 | 8/1974 | Rybicki et al. | 416/134 A |
| 3,862,812 | 1/1975 | Gorndt et al. | 416/141 |
| 4,028,002 | 6/1977 | Finney et al. | 416/134 A |
| 4,142,833 | 3/1979 | Rybicki et al. | 416/134 A |
| 4,203,708 | 5/1980 | Rybicki | 416/141 X |
| 4,232,563 | 11/1980 | Peterson et al. | 74/470 |
| 4,249,862 | 2/1981 | Waddington et al. | 416/134 A |
| 4,251,187 | 2/1981 | Hollrock | 416/134 A |
| 4,306,836 | 12/1981 | Mayerjak | 416/134 A |

FOREIGN PATENT DOCUMENTS 2709199  9/1977  Fed. Rep. of Germany ...... 416/141

Primary Examiner—Everette A. Powell, Jr.
Attorney, Agent, or Firm—James T. FitzGibbon

[57] ABSTRACT

An elastomeric bearing assembly for supporting a rotor blade of a helicopter including a spherical elastomeric section mounted in serial relationship to a pair of frusto-conical elastomeric bearing section on the blade shaft. The frusto-conical bearing section includes two elastomeric bearings having bonded and alternate layers of elastomeric and non-extensible material and are arranged to receive the resulting force vectors in a direction normal to their planar surfaces.

18 Claims, 3 Drawing Figures

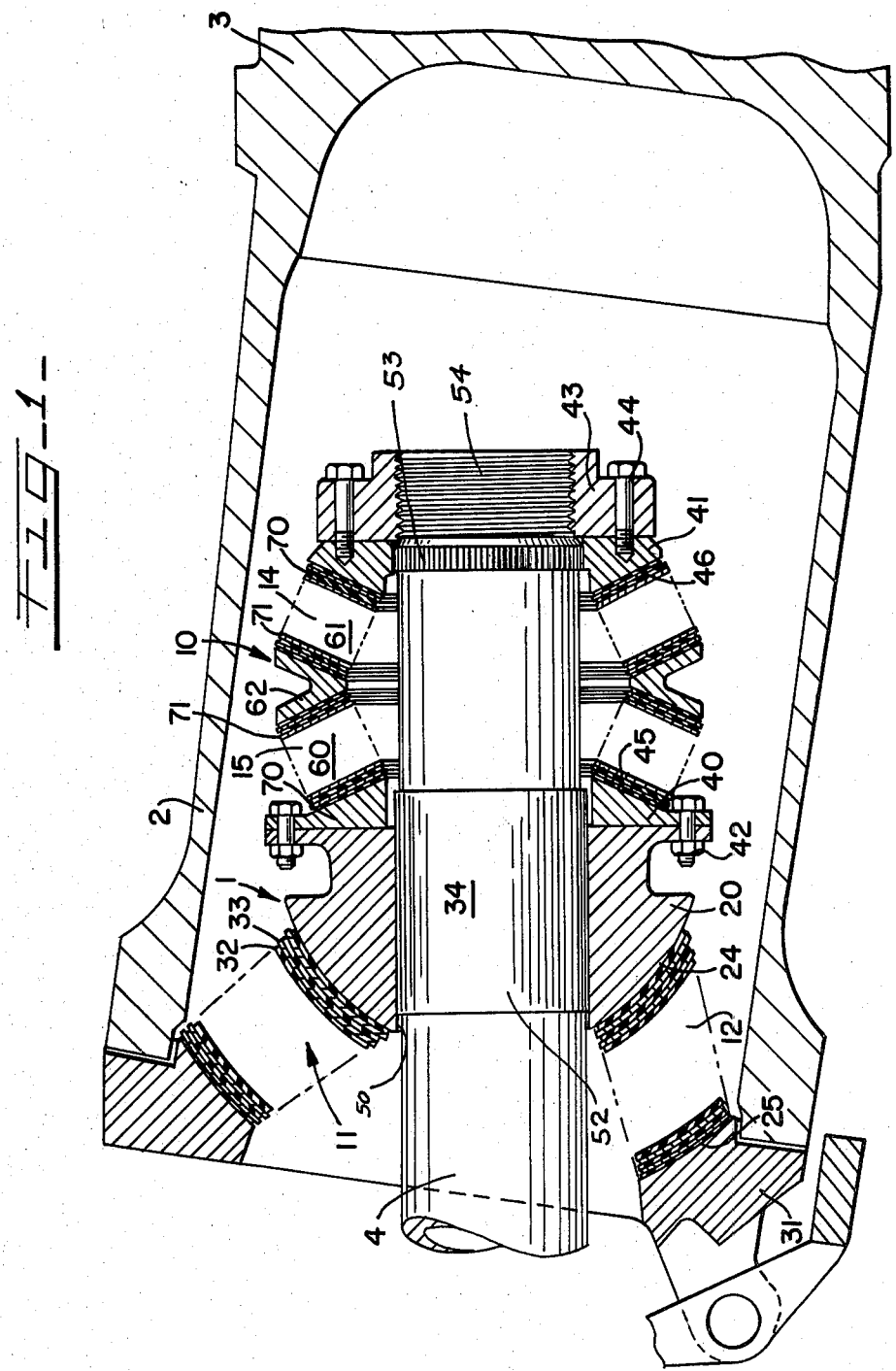

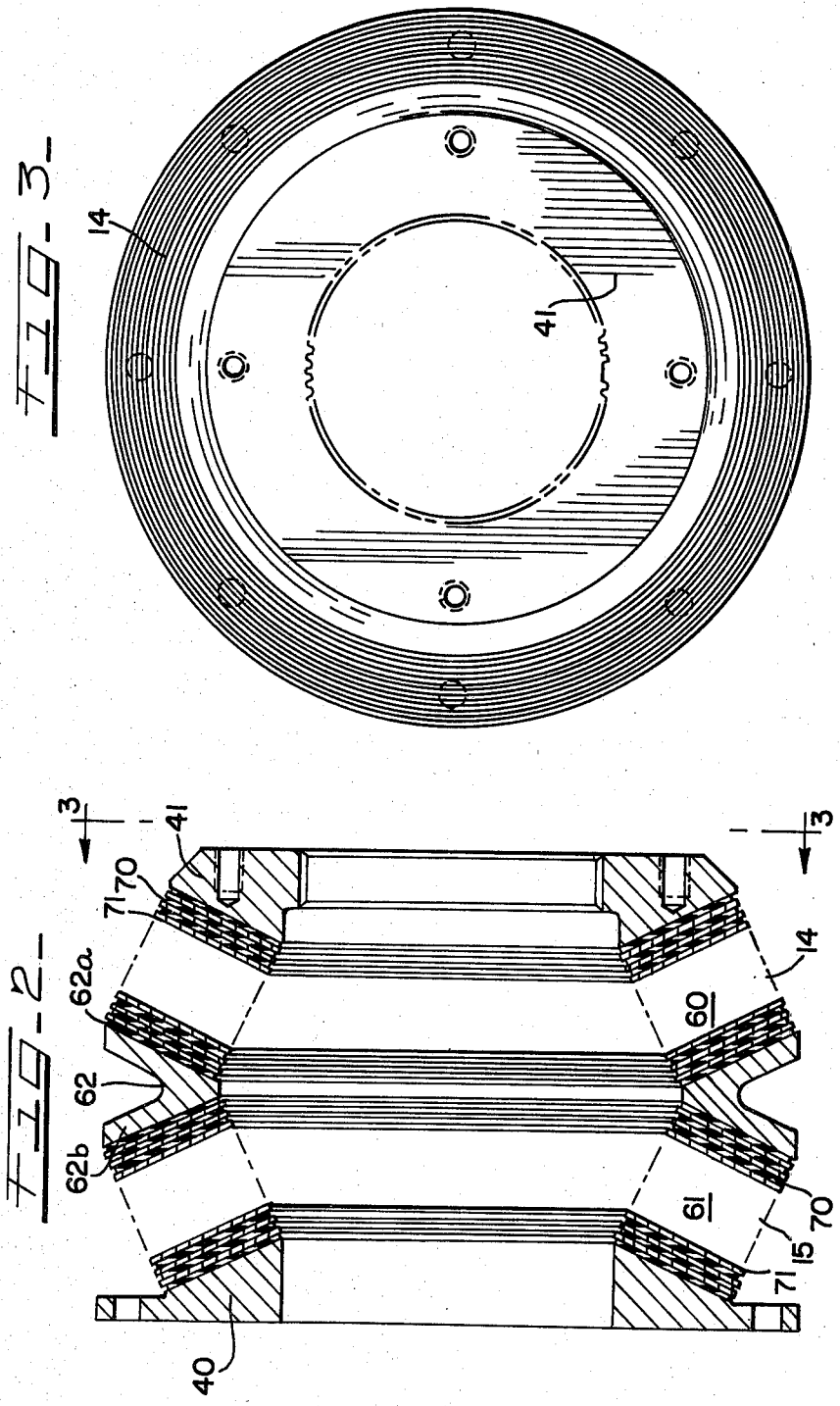

LAMINATED ELASTOMERIC BEARING UNIT

BACKGROUND OF THE INVENTION

This invention relates in general to elastomeric bearings and, in particular, to a laminated bearing for supporting the rotor blade of a helicopter.

More specifically, this invention relates to an improved elastomeric bearing assembly of a laminated construction employing the combined effects of a spherical retention bearing and a pair of serially arranged frusto-conical thrust sections to improve the method of retention of the rotor blade of a helicopter. The laminated elastomeric bearing assembly of the invention comprises an assembly having minimal size and weight and, an effective increase of bearing life.

A helicopter rotor blade undergoes a multitude of complex planar and non-planar movements during rotation to develop lift and induce directional movement of the aircraft. The cross section of a helicopter blade possesses a configuration similar to the air foil of a fixed-wing airplane. Upward lift to overcome the weight of the helicopter is achieved by the passage of the air-foil shaped blade through the air. This lift is controlled by selective manipulation of the angular orientation of the individual blades while being swept through the air with a rotary motion. Blade orientation is further varied to effect movement of the helicopter in any direction, decrease its altitude, or maintain the craft stationary while airborne. Such variation in orientation involves alterations of angle of attack during each revolution of the rotor to produce oscillating pitch changes of the blade through rotation about its longitudinal axis. In addition to pitch changes, the rotor blade undergoes movements in the plane of rotation, known in the art as lead/lag, and oscillatory movements substantially perpendicular to the plane of rotation, commonly referred to as flapping.

Because of the foregoing need for constant adjustments of the helicopter rotor during flight, its blade support system must accommodate a multitude of motions and must resist a complex pattern of forces without failure. The mere rotation of a plurality of rotor blades imposes large centrifugal forces on the blade bearing support. Moreover, oscillatory changes about the axis of the blade to alter pitch subjects the blade retention system to a considerable torsional loading. In addition to the centrifugal and torsional loads, a blade retention system must also resist forces arising in conjunction with such factors as lead/lag, and flapping movements.

The design of a helicopter necessarily requires the application of sophisticated technology, in part because of the foregoing dynamics and force patterns. The retention system of a rotor blade plays a vital role in the operation of the helicopter and must accommodate the multi-directional forces which are encountered while accommodating the required blade motions. Frequent and continual failure of the bearing support of a blade is costly and potentially detrimental to the structural integrity of the helicopter, particularly if problems develop in the bearing assembly while the aircraft is in flight. Simple economics and efficiency demand, however, that lengthy operative service of the bearing be attained by a lightweight assembly of minimum cost. It is a continuing problem in the prior art that known bearing supports of rotor blades require components of undesirable high weight or employ exotic and expensive materials to attain suitable service.

In the prior art, the foregoing and other forces, inherent in the rotation of the rotor of a helicopter, were supported by means of non-friction bearings in earlier versions of helicopters. Non-friction bearings proved unsatisfactory because of a short lifetime of service, a relative heavy weight, and the requirement of frequent servicing among many problems. The shortcomings of non-friction bearings were, in part, overcome by the introduction of laminated elastomeric bearings of various designs. Some of these laminated support assemblies employ different combinations of bearing sections having alternate layers of elastomeric material bonded to a more rigid shell material, such as metal.

In an elastomeric rotor support system it is common practice to use an elastomeric bearing with spherical laminations to accommodate the three angular displacements required of the blade while sustaining all blade reaction forces. It is difficult to design a spherical bearing that will sustain the full amount of the pitch change motion required. Frequently an additional elastomeric bearing is added to the system to handle most of the pitch change motion while carrying only the centrifugal load. At first thought it would seen that the laminates for this bearing should be flat annular washers. For practical designs this idealistic bearing seldom has column stability. The prior art solution to this stability problem has been to step the shells or convolute them as shown in Rybicki, U.S. Pat. No. 4,142,833. The results have always been a large increase in stress and strain over the idealistic flat laminated bearing.

The laminated constructed prior art blade support bearings have also required expensive material and costly manufacturing techniques in order to achieve a satisfactory lifetime of service and high resistance to failure. The type of elastomeric bearing as shown in U.S. Pat. No. 4,142,833 to Rybicki employs an annular thrust bearing of a laminated construction to absorb centrifugal forces generated by the rotation of the blades. The convoluted metal laminates in the annular section of Rybicki are subject to high stress in compression because the resultant force vectors applied to the thrust bearings are not perpendicular to the planar face of the laminates. Accordingly, the metal laminates must be made of high strength material to resist the resulting bending and avoid fatigue and early failure. The elastomer layers must also be more closely spaced to resist the non-uniform strain found in this type of bearing.

Another prior art bearing system is shown in U.S. Pat. No. 4,028,002 to Finney, et al. and relies upon the combined effect of spherical and conical laminated bearing sections to retain the blade during its multitude of movements. The conical sections of the bearing of Finney, et al. are intended to provide great lateral stiffness with the result that longitudinal loads produce very high elastomer strains. Such a technique also does not achieve optimum support of a rotor blade of a helicopter.

SUMMARY OF THE INVENTION

It is, therefore an object of this invention to provide an improved laminated elastomeric bearing.

Another object of this invention is to support the blade of a helicopter rotor by elastomeric bearing assembly having a frusto-conical and spherical bearing sections.

A further object of this invention is to extend the lifetime of service of an elastomeric bearing employed in the retention of the rotor blade of a helicopter.

Still another object of this invention is to direct the resultant force vectors of a compressive loading in a direction normal to the planar surface of the laminates of an elastomeric frusto-conical bearing section.

A still further object of this invention is to increase the thickness of the layers of a laminated elastomeric bearing for retention of helicopter blades.

Still another object of this invention is to reduce metal stress in a laminated elastomeric bearing to permit the use of a shell material having a lighter weight and lower cost.

These and other objects are attained in accordance with the present invention wherein there is provided an improved laminated elastomeric bearing for supporting the rotor blade of a helicopter blade whereby an elastomeric spherical bearing is arranged in series with a pair of frusto-conical elastomeric bearings. The frusto-conical section possesses a novel configuration by which the individual layers thereof are subjected to aligned vector forces during compressive loading which are directed normal to their planar surfaces. The novel bearing of the invention minimizes stresses to produce column stability and substantially eliminates secondary moments and resulting stress and strain. The subjection of the bearing elements of the elastomeric bearing herein disclosed to aligned force vectors also eliminates bend and rotation, and thus reduces stress to permit less expensive non-extensible material of light weight, such as aluminum, to be employed as the shells in the laminated sections. Moreover, the unique design of the bearing of the invention allows the individual laminates of elastomeric sections to be formed from a thicker material, increasing the overall strength of the assembly. One significant advantage of the invention is that it achieves column stability with a minimum increase in strain over a flat shell bearing.

BRIEF DESCRIPTION OF THE DRAWINGS

Further objects of the invention together with additional features contributing thereto and advantages accruing therefrom will be apparent from the following description of a preferred embodiment of the invention, which is shown in the accompanying drawings, wherein like reference numerals indicate corresponding parts throuhout, wherein:

FIG. 1 is a side schematic illustration, with parts in section, of the laminated elastomeric bearing of the invention;

FIG. 2 is a sectional illustration of the frusto-concial laminated bearing section of the bearing of FIG. 1; and FIG. 3 is an end schematic llustration taken along line 3—3 of FIG. 2.

DESCRIPTION OF A PREFERRED EMBODIMENT

Referring now to FIG. 1, there is illustrated a laminated elastomeric bearing assembly of the invention, generally designated reference numeral 1. Although not intended to be so limited, the bearing assembly is shown supporting a blade of the rotor of a helicopter from its rotor hub for rotation about an axis in a conventional manner. The laminated elastomeric bearing 1 is positioned within a rotor sleeve member 2 initially extending outwardly from the rotor hub or head 3 of a helicopter (not shown). The laminated elastomeric bearing 1 supports a blade carrying shaft 4 within the rotor sleeve member. The helicopter blade (not shown) is attached by a conventional coupling means (not shown) to the shaft 4 through which rotation of the hub transmits rotation of the rotor blades about the central axis of the rotor. The laminated elastomeric bearing assembly 1 permits the blade to twist about its longitudinal axis to provide oscillatory pitch adjustments relative to the hub. The bearing assembly 1 further permits the blade to undergo flapping motion in a direction perpendicular to its plane of rotation along with lead/lag motion in a direction normal thereto.

The laminated elastomeric bearing assembly comprises a pair of bearing sections 10 and 11 which in concert act to permit the foregoing motions of the blade with optimum retention and stiffness characteristics. Bearing sections 10 and 11 respectively include a spherical elastomeric thrust bearing 12 of a laminated construction and a pair of serially oriented frusto-conical elastomeric bearings 14 and 15 also in the form of a laminated construction. The spherical elastomeric thrust bearing 12 is carried on a spacer or sleeve 20 secured in surrounding relationship to the blade carrying shaft 4. The spacer or sleeve possesses a central opening 21 which surrounds a cylindrical raised portion 22 of shaft 4 to create a centering bearing for the shaft. An outer portion 23 of the periphery of the spacer or sleeve 20 possesses a spherical surface forming an inner race 24 of the spherical elastomeric bearing 12.

An outer spherical race 25 of bearing 12 is formed on an inner surface of an annular end plate 31 suitably affixed to sleeve member 2 by any technique of attachment, such as, for example, by means of a threaded bolt member or the like. The laminated construction of the spherical bearing is formed from alternate bonded spherical layers, laminates, or shims 32 and 33 of elastomeric material and non-extensible material, respectively, with end elastomeric layers being bonded to races 24 and 25. The elastomeric material forming laminates 32 may be fabricated from a natural rubber or any other material or suitable elastomeric properties such as some forms of plastic, synthetic rubber and fiberglass. The non-extensible material forming the other laminates or shells 33 of the spherical bearing may be a metal, or any other type of non-extensible material in the form of plastic and the like.

Each of the laminates 32 and 33 are concentric about focal point 34 whereby the centers of hydrostatic pressure generated in the elastomeric laminate cross-section by centrifugal force loading are in alignment with each other and with the cross-sectional centers of gravity of the metal shim laminates, and as a result in alignment with focal point 34. The spherical elastomeric bearing 12 is not only capable of supporting large centrifugal forces through compression of the elastomeric material of its laminated layers, but permits torsional movement during pitch changes of the helicopter blade through shear of the layers. The spherical elastomeric bearing further provides a degree of stiffness for lateral loads caused by such factors as flapping and lead/lag motions.

The spherical elastomeric thrust bearing 12 is mounted in serial relationship to a pair of frusto-conical bearings 14 and 15 shown in FIGS. 1, 2 and 3. The frusto-conical bearings 14 and 15 are mounted between a pair of annular like end plates 40 and 41 which surround shaft 4. One end plate 40 is attached by suitable means, such as bolts 42, to the spacer or sleeve 20. The opposite end plate 41 is positioned in coupling relationship to the end of the blade carrying shaft 4 and is affixed to a nut member 43 carried by the shaft 4. The nut member 43 is in turn affixed to plate 41 by a plurality of bolt members 44, as best shown in FIG. 1. The end plates 40 and 42 provide respective confronting frusto-conical surfaces 45 and 46 concentrically lying in planes angularly oriented with respect to the longitudinal axis of the shaft 4 in a non-normal relationship.

The pair of conical elastomeric bearings 14 and 15 include two laminated sections 60 and 61 disposed between the surfaces 45 and 46 of the end plates. Sections 60 and 61 are separated by a V-shaped intermediate member 62 having conical faces 62a and 62b which transmits the force applied in the first laminated section 60 to the second laminated section 61 and itself supports stress applied to the conical sections 14 and 15. The laminated sections 60 and 61 are in the form of alternate bonded layers 70 and 71 of elastomeric and non-extensible material, respectively, such as employed in conjunction with the spherical bearing 12. The end layers are elastomeric material bonded to the surfaces of intermediate member 62 and surfaces 45 and 46. Each laminate 70 and 71 is frusto-conically shaped and progressively increases in peripheral diameter in a direction away from surfaces 45 and 46 to intermediate member 62.

The conical orientation of the layers of sections 60 and 61 in relation to the longitudinal axis of the shaft is selected in a manner that the resultant force vectors applied to the laminates are always perpendicular to the flat planar surface of the laminates 70 and 71 in response to the centrifugal forces generated by rotation of the blade. Such an orientation of the conical bearings insures that the failure of the non-extensible material in resisting a compression loading is alleviated because the aligned vectors acting in a normal direction do not cause bending or rotation of the elements and reduce the stress applied to the shims. Moreover, the strain to which the elastomeric laminates are subjected in the bearing assembly of the invention is relatively low for sustained life. The conical sections of the invention thereby increase the lifetime of service of the bearing assembly with a highly economical design and can effectively handle longitudinal and torsional loading of the blade. Because of the improved characteristics attributable to the elastomeric bearing assembly herein disclosed, the non-extensible layers of the elastomeric sections may employ less costly metals of lighter weight such as, for example, aluminum to achieve the desirable objective of overall weight reduction.

As will be understood, the principal purpose of the pair of sections 60, 61 is to locate the supported load, which, in a typical case, is the shaft 4 at the inboard end of a helicopter rotor blade, in such a manner as to provide good column strength and stability, with minimum application of distorting strains to the sections 60, 61, while permitting a wide range of pitch changes. While the angle of inclination between the blade axis and the direction in which each of the frusto-conical sections 60, 61 extends may vary within limits, it has been found, in a typical application, that this angle should be equal to or less than 40°. In most cases, the angle is preferably between about 20° and 30°. The selection of the proper angle depends on the number of laminae, their radial and axial thicknesses, the total forces generated, and other factors. In most cases, the angles referred to herein provide the column stability and strain distributions. Generally these values also provide freedom from excess bending and rotational strains within the individual shims or laminated sections.

As the angle (the "cone angle") between the blade axis and the frusto-conical inner diameter of the bearings 14, 15 approaches 0°, column stability is lost, while if the angle is too steep, such as 45° to 60° or more, the blade or other supported load suffers from greatly reduced stiffness in column loading, that is, compression axially of the blade. Stated otherwise, assuming that the value of the load remains constant, as this cone angle increases past the optimum angle, the stresses in the bearings also increase, thereby creating a risk of early wear-out or premature failure of the elastomeric bearings.

Referring again to FIG. 1, it will be noted that lateral centering of the shaft portion 4 forming the inner portion of the blade is achieved by engagement of the inner cylindrical surface 50 of the inner bearing race 24 with the outer diameter of a centering bearing 52. This construction permits relative motion by the laminated bearing 11 and the blade shaft 4 as centrifugal force loadings change. In this connection, when the centrifugal force loading increases, the inner race 24 may move somewhat to the left as shown in FIG. 1 because its laminae are compressed. However, there is significant additional compression of the laminae in the bearing sections 60 and 61, and this permits the inner blade end to move toward the left in FIG. 1. Thus, as centrifugal force loads increase, the blade moves slightly outwardly. The bearing 52, which is customarily made from a carbon-graphite or other anti-friction material, permits the sliding action just referred to and also permits the blade shaft 4 to rotate about its longitudinal axis during pitch changes.

Referring to the inner end of the blade, it will be noted that it is securely located with respect to the bearings 14, 15 by engagement of threads formed respectively on the shaft 4 and the nut 43; additional locking force is provided by the splines 53 just outboard of the threaded area 54. In the prior art, where counterparts of Sections 60 and 61 were provided, but where such bearing units used large cone angles, such as angles of 45° to 60° or more, for example, an attempt was thereby made to achieve centering without the use of a centering bearing 52. While such a construction may be satisfactory in some respects, the steep cone angles just referred to herein would, as a practical mater, rule out the use of such bearings as elements intended to support a column load. According to the present invention, centering is achieved by the spherical bearing 11 and the centering bearing 52, while column stiffness and stability are provided by the bearings 14, 15; these latter units also provide means for allowing the degree of pitch change which may be required or which may be desired by the designer.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An elastomeric bearing assembly comprising
   a first member adapted to be operatively coupled to the support shaft of a rotor blade mounted for rotation in conjunction with the hub of a helicopter and forming a first frusto-conical surface,
   a second member adapted to be coupled to the shaft and forming a second frusto-conical surface spaced from said first surface,
   a pair of frusto-conical elastomeric bearing sections disposed between said first and second surfaces,
   one of said frusto-conical bearing sections being bonded to the first surface and the other section being bonded to the second surface,
   said frusto-conical bearing sections each having a plurality of alternating and bonded frusto-conical layers of elastomeric and non-extensible material and having planar surfaces,
   an intermediate member separating said first and second frusto-conical bearing sections,
   said first and second frusto-conical bearing sections being arranged to receive the resultant force vectors from an applied load in a direction normal to the planar surfaces of said layers of elastomeric and non-extensible material,
   said frusto-conical sections being disposed along an axis normal to said planar surfaces which is at an angle less than 45 degrees to an axis extending parallel to the support shaft of the rotor blade,
   a spherical bearing section adapted to be coupled to the blade support shaft and mounted in serial relationship to said first and second frusto-conical surfaces, and
   means forming a centering bearing operatively coupled to at least a portion of said spherical bearing section and in bearing relationship with the support shaft.

2. The bearing assembly according to claim 1 wherein one of said layers of elastomeric material of said pair of frusto-conical sections are bonded to said first and second surfaces, respectively.

3. The bearing assembly according to claim 2 wherein said intermediate member includes a pair of frusto-conical surfaces respectively contacting an elastomeric layer of said first and second bearing sections.

4. The bearing assembly according to claim 3 wherein said layers of said first and second bearing sections contacting said surfaces of said intermediate member are bonded thereto.

5. The bearing assembly according to claim 4 wherein said intermediate member possesses an annular configuration.

6. The bearing assembly according to claim 5 wherein said intermediate member includes substantially a V-shaped cross-section.

7. A bearing assembly according to claim 1, in which said angle between said frusto-conical sections and an axis lying generally parallel to the axis of the support shaft is from about 5 degrees to about 40 degrees.

8. A bearing assembly according to claim 1, in which said angle between said frusto-conical surfaces and an axis lying generally parallel to the axis of said rotor blade is from about 20° to about 30°.

9. The bearing assembly according to claim 1 wherein said spherical bearing section includes an elastomeric construction.

10. The bearing assembly according to claim 1 wherein spherical bearing section includes a sleeve member adapted to be coupled to said blade support shaft, said sleeve member having an outer spherical surface forming an inner race of said spherical bearing section.

11. The bearing assembly according to claim 10 wherein said sleeve member is physically coupled to said first member.

12. The bearing assembly according to claim 10 wherein said sleeve member includes an internal bearing surface adapted to concentrically surround a portion of the blade shaft to form a centering bearing therewith.

13. An elastomeric bearing assembly comprising
    a first member adapted to be operatively coupled to the support shaft of a rotor blade mounted for rotation in conjunction with the hub of a helicopter and forming a first surface,
    a second member adapted to be coupled to the shaft and forming a second surface spaced from said first surface,
    at least one frusto-conical elastomeric bearing section disposed between said first and second surfaces,
    said at least one frusto-conical bearing section being bonded to said first and second surfaces,
    said at least one frusto-conical bearing section having a plurality of alternating and bonded frusto-conical layers of elastomeric and non-extensible material and having planar surfaces,
    said at least one frusto-conical bearing section being arranged to receive the resultant force vectors from an applied load in a direction normal to the planar surfaces of said layers of elastomeric and non-extensible material,
    said direction normal to said planar surfaces being disposed at an angle less than 45 degrees to the axis of the rotor blade,
    bearing means operatively coupled to the support shaft of the rotor blade and being cooperatively arranged to act with said at least one frusto-conical elastomeric bearing section to retain the rotor blade,
    said bearing means includes a spherical bearing section, and
    means forming a centering bearing between said shaft and a portion of said bearing means.

14. The elastomeric bearing assembly of claim 13 wherein said spherical bearing section includes alternate layers of bonded elastomeric and non-extensible material.

15. A rotor blade retention system comprising
    a hub mounted for rotation on a helicopter
    a rotor blade support shaft coupled to said hub for rotation therewith,
    a first member coupled to said rotor blade support shaft and forming a first surface,
    a second member coupled to said rotor blade support shaft and forming a second surface spaced from said first surface,
    at least one frusto-conical elastomeric bearing section disposed between said first and second surfaces,
    said at least one frusto-conical bearing section being bonded to said first and second surfaces,
    said at least one frusto-conical bearing section having a plurality of alternating and bonded frusto-conical layers of elastomeric and non-extensible material and having planar surfaces, said at least one frusto-conical bearing section being arranged to receive the resultant force vectors from an applied load in a direction normal to the planar surfaces of said layers of elastomeric and non-extensible material, said direction normal to said planar surfaces being disposed at an angle less than 45 degrees relative to the longitudinal axis of said support shaft, a spherical bearing section coupled to said support shaft and mounted in serial relationship to said frusto-conical bearing section, and means forming a centering bearing between at least a portion of said spherical bearing section and said support shaft.

16. The rotor blade retention system of claim 15 wherein said at least one frusto-conical bearing section comprises a plurality of sections.

17. The rotor blade retention system of claim 15 wherein the angle between an inner surface of said frusto-conical bearing surface and the axis of said rotor blade lies between about 5° and about 40°.

18. The rotor blade retention system of claim 15 wherein an inner surface of said frusto-conical bearing surface and the axis of said rotor blade lies between about 20° and about 30°.

* * * * *

UNITED STATES PATENT AND TRADEMARK OFFICE
CERTIFICATE OF CORRECTION

PATENT NO. : 4,365,936

DATED : December 28, 1982

INVENTOR(S) : Seymour A. Hatch

It is certified that error appears in the above—identified patent and that said Letters Patent is hereby corrected as shown below:

Column 2, line 25, delete "seen" and insert "seem"

Column 4, line 41, delete "or" and insert "of".

Signed and Sealed this

Twenty-eighth Day of June 1983

[SEAL]

Attest:

GERALD J. MOSSINGHOFF

Attesting Officer

Commissioner of Patents and Trademarks